July 15, 1952 W. R. CLARK 2,603,096
ACTUATING MECHANISM
Filed Oct. 1, 1948 5 Sheets-Sheet 1

INVENTOR
William Russell Clark
BY
Woodcock & Phelan
ATTORNEYS

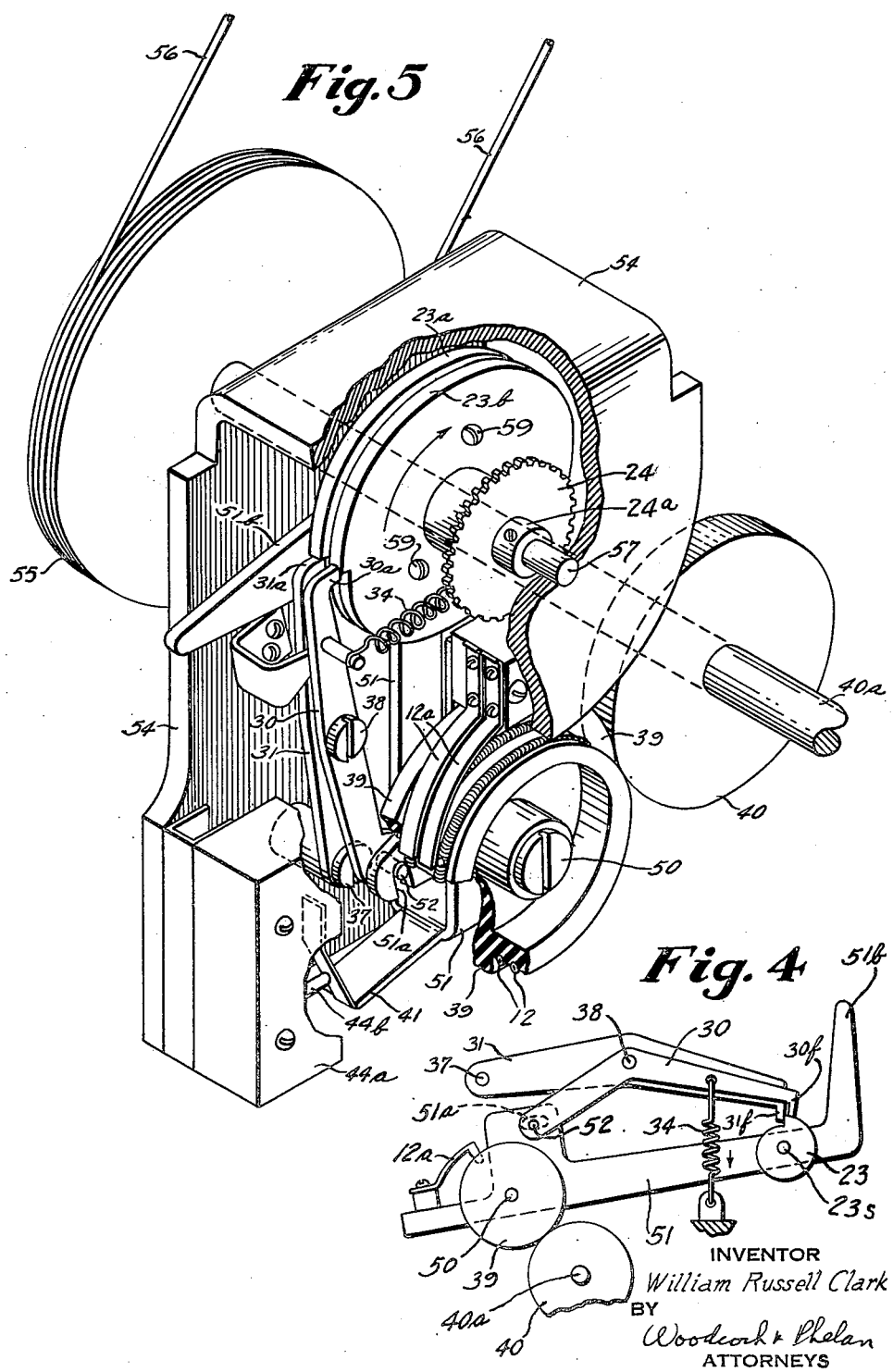

July 15, 1952  W. R. CLARK  2,603,096
ACTUATING MECHANISM
Filed Oct. 1, 1948  5 Sheets-Sheet 3

INVENTOR
William Russell Clark
BY
Woodcock & Phelan
ATTORNEYS

July 15, 1952          W. R. CLARK          2,603,096
ACTUATING MECHANISM
Filed Oct. 1, 1948          5 Sheets-Sheet 4
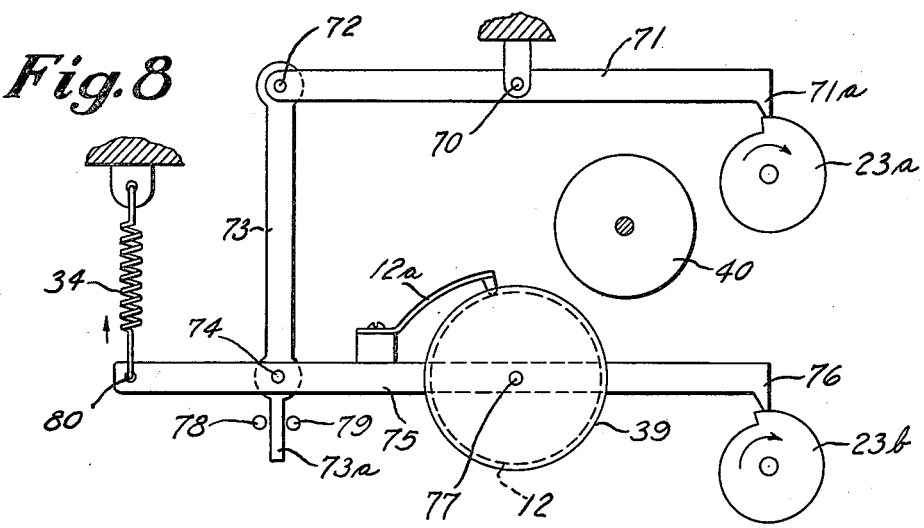
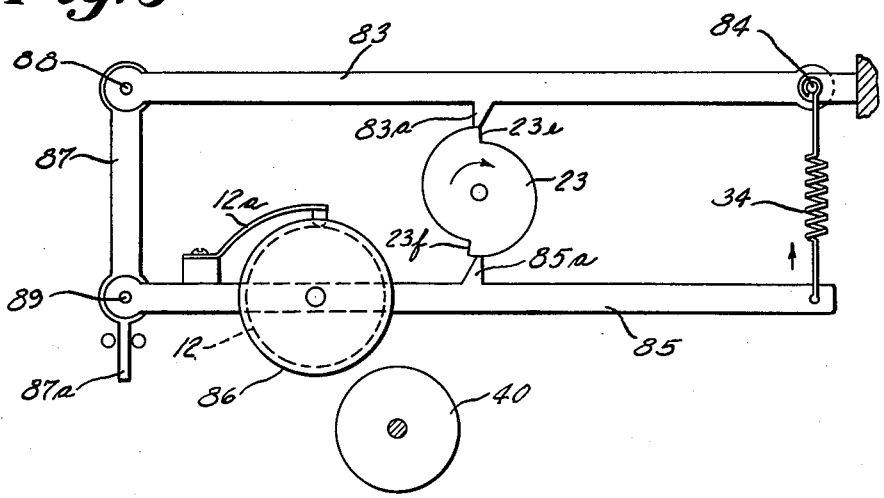
INVENTOR.
William Russell Clark
BY
Woodcock & Phelan
ATTORNEYS July 15, 1952 — W. R. CLARK — 2,603,096

ACTUATING MECHANISM

Filed Oct. 1, 1948 — 5 Sheets-Sheet 5

INVENTOR.
William Russell Clark
BY
Woodcock & Phelan
ATTORNEYS

Patented July 15, 1952

2,603,096

UNITED STATES PATENT OFFICE 2,603,096

ACTUATING MECHANISM

William Russell Clark, Jenkintown, Pa., assignor to Leeds and Northrup Company, Philadelphia, Pa., a corporation of Pennsylvania Application October 1, 1948, Serial No. 52,368

20 Claims. (Cl. 74—54)

This invention relates to actuating mechanism for operating a control member between predetermined positions and is of the type which is particularly useful for effecting either manual or automatic standardization of a measuring network.

In self-balancing recorder and controller systems, such as shown and described in United States Letters Patent No. 2,113,069, granted to Ross et al., automatic standardization of the measuring network is from time to time effected by temporarily shifting the connection of the detector, such as a galvanometer or other device, from the measuring network to a standardizing circuit and by concurrently effecting a mechanical driving connection between a standardizing impedance or equivalent and the rebalancing device so that the detector and balancing mechanism are operative to effect adjustment of the standardizing rheostat in compensation for any shift in calibration of the measuring network. While the actuating mechanism of the aforesaid Ross et al. patent has been satisfactory and used to substantial extent, nevertheless it leaves something to be desired in a mechanism which will operate with less torque requirements than heretofore required.

Accordingly, it is an object of the present invention to provide an actuating mechanism having low torque requirements and sufficiently low that it becomes feasible to utilize a smaller driving motor for the chart of an instrument such as disclosed in said Ross et al. patent; and where a separate motor is used for automatic standardization, such motor may be relatively inexpensive due to the low torque requirements of the actuating mechanism.

In carrying out the present invention in one form thereof, energy is slowly accumulated in a biasing means over a relatively long period of time. By means of a cam structure controlling the positions of a pair of levers a part of the accumulated energy is utilized to effect a coupling movement of a standardizing impedance with a driving member, and after completion of the standardizing operation the remainder of the accumulated energy is utilized in decoupling the standardizing impedance from the driving member. The two levers are pivotally interconnected intermediate their ends with one lever pivoted to stationary structure and having a cam follower engaging the cam structure, while the other lever having a cam follower has its opposite end operatively connected to the standardizing impedance. While the actuating mechanism has been found particularly useful for manual or automatic standardizing, it is to be understood that it may be used for other purposes and is particularly applicable to the movement of a control member first to one position and then to a second position, the time during which the control member is at one or the other of the positions being readily adjustable.

For a more detailed understanding of the invention, together with further objects and advantages thereof, reference is to be had to the following description taken in conjunction with the accompanying drawings, in which:

Fig. 1 diagrammatically illustrates a system embodying the invention;

Figs. 2 and 3 are fractional views of the actuating mechanism of Fig. 1 illustrating the parts in different positions;

Fig. 4 diagrammatically illustrates the mechanism of Figs. 6 and 7;

Fig. 5 is a perspective view, with parts broken away, of the preferred commercial form of the device;

Figure 6:
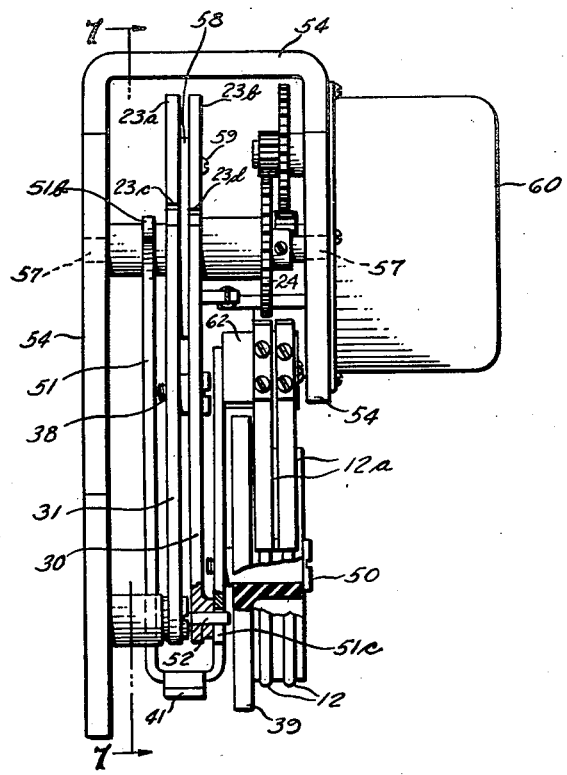
Fig. 6 is a side elevation of the device of Fig. 5.
Figure 7:
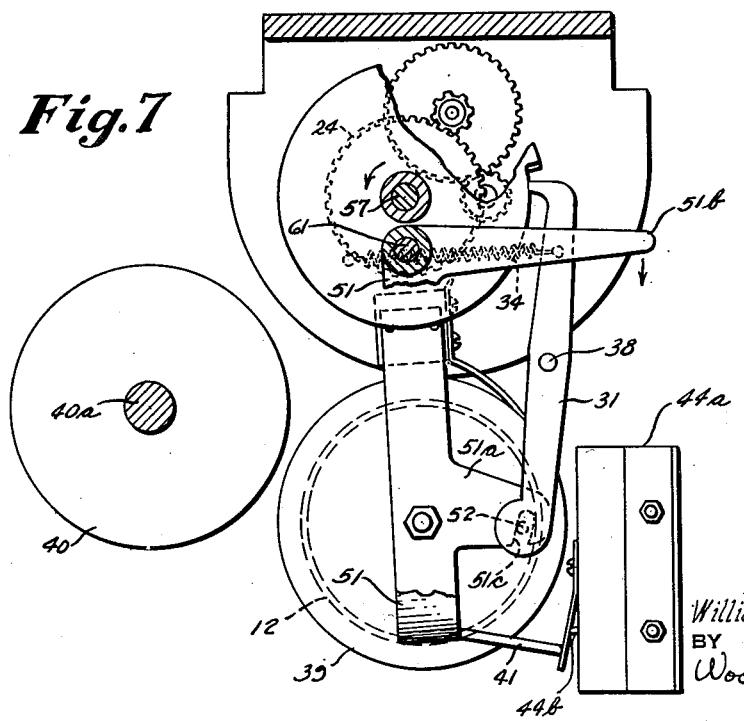

Fig. 7 is a cross-sectional view taken on the lines 7—7 of Fig. 6; however, it is to be noted that it is not a true sectional view since in Fig. 7 the lever 51 is supported by a separate pivot pin 61 and not by cam shaft 57 as it is shown in Fig. 6; and Figs. 8-12 inclusive diagrammatically illustrate further modified forms of the invention.

Figure 1:
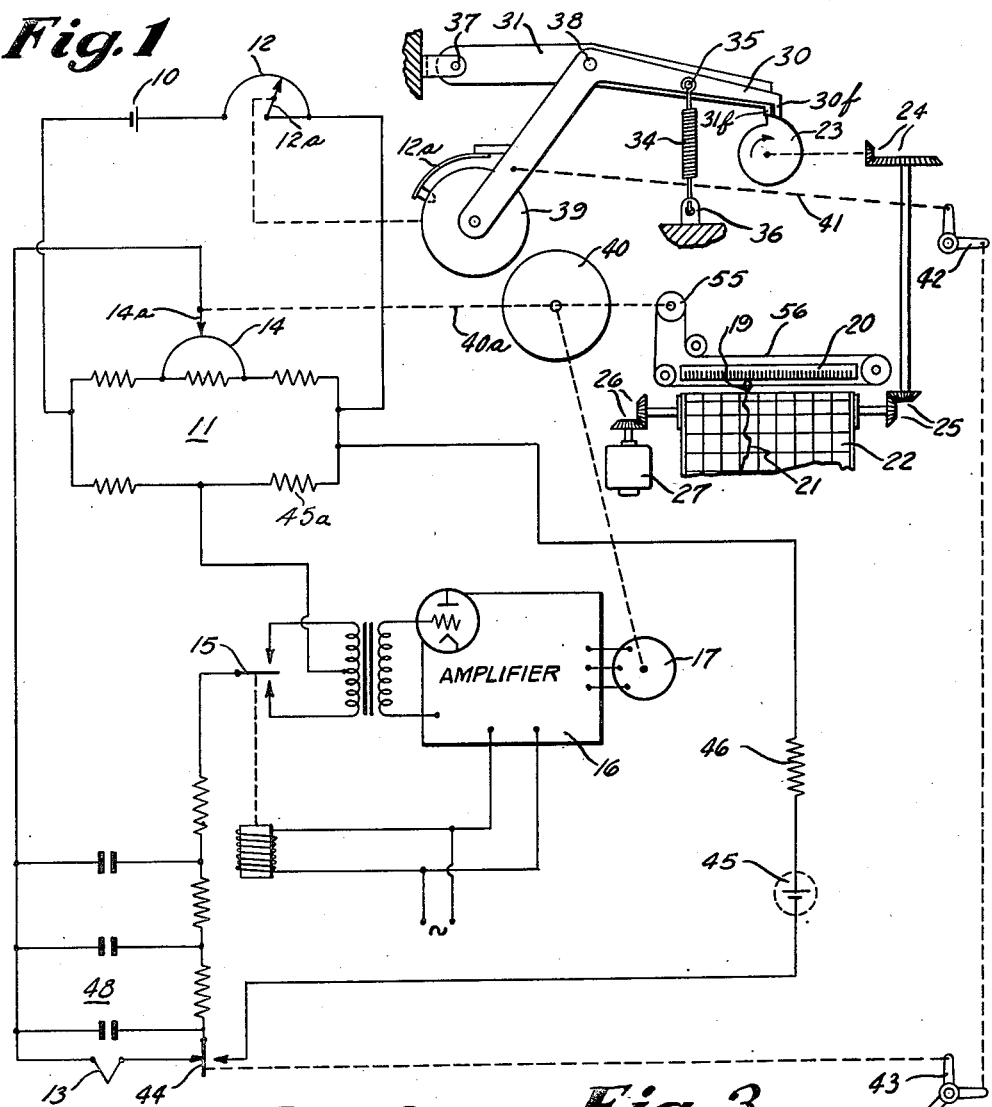

In Fig. 1 the invention has been illustrated as applied to the standardization of the voltage applied by a battery 10 to a measuring network 11, the magnitude of such voltage being under the control of a standardizing impedance shown in the form of a slidewire resistor 12. A thermocouple 13 produces a voltage in accordance with the temperature to which it is subjected, which voltage is opposed by a potential difference derived from the measuring network under the control of a slidewire resistor 14. The difference-voltage is converted to alternating current by a converter 15 amplified by an amplifier 16 and is utilized to energize a motor 17 which relatively adjusts the slidewire 14 with respect to its cooperating contact 14a to rebalance the network. The position of an indicator 19 with reference to a scale 20 provides an indication of the magnitude of the temperature to which the thermocouple 13 has been subjected. A marker or pen may be associated with the indicator 19 for producing a visible record 21 on a chart 22 to show change in temperature over substantial periods of time.

In measuring systems of the null type, those in which the voltage of a battery is opposed to that of a device subject to a variable condition, it is well understood by those skilled in the art that it is necessary to maintain constant the voltage applied by the battery to the potentiometer network. It is further well understood that the voltage of batteries of the type used in measuring circuits, generally of the dry cell type, does not remain constant but tends to decrease with age and also varies with change in the ambient temperature. Accordingly, it is desirable frequently to effect a standardizing operation at such intervals of time as may be necessary to minimize inaccuracy of measurement due to change in the voltage applied to the potentiometer of the measuring network.

In Fig. 1 a cam structure 23 is driven through gearing 24, 25 and 26 by a motor 27, preferably of the synchronous type, which also serves to drive the chart 22. The cam structure 23 is driven at a speed determined by one or more of the gear ratios and may be such that a standardizing cycle is initiated every half-hour. During such thirty minute period a pair of levers 30 and 31, having cam followers 30f and 31f, are moved from their lowermost positions to the positions illustrated in Fig. 1. During the revolution of the cam structure 23 a spring 34 having one end attached by a pin 35 to lever 30 and its opposite end attached to stationary structure 36 slowly accumulates energy. The end of lever 31 remote from cam follower 31f is pivoted to stationary structure 37, and the two levers 30 and 31 are pivotally connected intermediate their ends by a pivot pin 38, thus allowing a scissor-like movement therebetween. A driving disc 39 for the slidewire 12 is rotatably supported by the end of lever 30 remote from cam follower 30f. As will be later explained, the driving disc 39 may form a part of the support for the slidewire which has associated therewith a contact 12a. For purpose of clarity, the contact 12a has been shown in its physical relationship with lever 30 and disc 39 and also schematically in association with the slidewire 12.

Figures 2, 3:
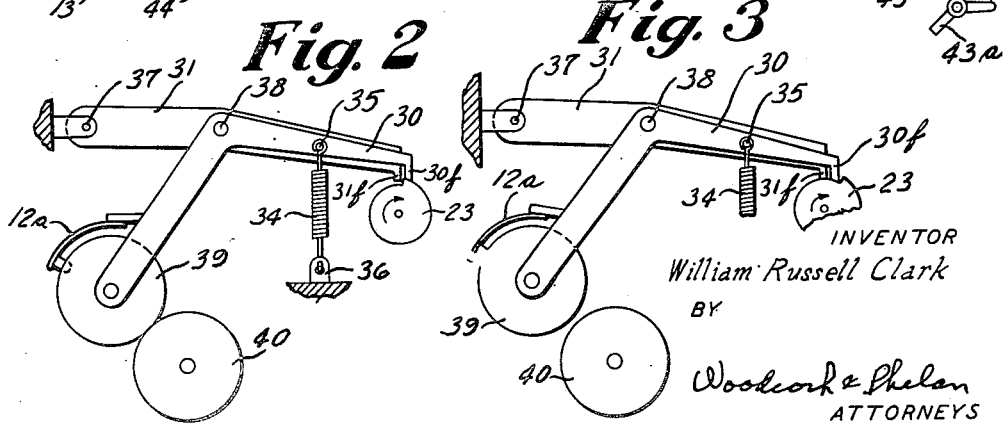

The standardizing operation is initiated when the cam 23 is rotated from the position shown in Fig. 1 to the position shown in Fig. 2. Upon release of the cam follower 31f, the accumulated energy of the spring 34 is effective through the pivot pin 38 to produce clockwise rotation of lever 31. Such clockwise rotation moves the pivot pin 38 in the same direction and thus rotates the lever 30 in a counter-clockwise direction, the pivotal movement being about an axis determined by the bearing of the cam follower 30f on the cam structure 23. Accordingly, as shown in Fig. 2, the driving disc 39 is moved into engagement with a driving member 40 driven by the motor 17. The counter-clockwise rotation of lever 30 is effective through a mechanical connection 41, Fig. 1, and by way of crank arms 42 and 43 to operate a transfer switch 44 which disconnects the thermocouple 13 from the measuring circuit and connects a standard cell 45 and a series resistor 46 in circuit with the converter 15 and the measuring network or potentiometer 11. If the voltage of the battery 10 has not changed, a potential difference will not appear at the converter 15 and the motor 17 will not be energized for rotation. However, if the voltage of battery 10 has changed since the preceding calibrating or standardizing operation, a voltage difference will appear at converter 15 and will produce energization of the motor 17 in a direction to rotate the driving disc 40 and the driven disc 39 in a direction to readjust the slidewire 12 with respect to its associated contact 12a by an amount which will again produce a balance condition in the network; i. e., will produce a voltage across the standardizing resistor 45a of the potentiometer 11 which will be exactly balanced by that developed by the standard cell 45 in opposition thereto. The standardizing operation need be but of short duration and may be accomplished in a time interval of around four seconds.

As shown in Fig. 1, the cam follower 30f extends slightly beyond cam follower 31f, and though exaggerated in the diagrammatic representation, the arrangement is such that in about four seconds the cam follower 30f is released by the cam structure 23. When this occurs the parts move from the position shown in Fig. 2 to the positions shown in Fig. 3. Upon release of cam follower 30f the spring 34 rotates the lever 30 in a clockwise direction about the pivot pin 38 providing a scissor-like action with respect to lever 31, thus moving the driven disc 39 out of driving engagement with the driving member 40, at the same time functioning through the mechanical connection 41 and the crank arms 42 and 43 to return the transfer switch 44 to the position shown in Fig. 1 with the thermocouple 13 connected to the converter 15. Accordingly, it will be seen that a part of the accumulated energy of the spring 34 was expended in initiating the standardizing operation and that the remainder of the accumulated energy was expended in terminating that operation. It will also be seen that the spring 34, acting in only one direction, nevertheless, produced movement of the disc 39 first in one direction for coupling engagement with driving member 40 and then in the opposite direction for decoupling therefrom.

Continued rotation of the motor 27 rotates the cam from the position shown in Fig. 3 to that shown in Fig. 1 and during a relatively long time interval, which may be of the order of a half-hour, energy is again accumulated in the spring 34 preparatory to a second or succeeding standardizing operation. With the parts in the positions shown in Fig. 3 the spring 34 may be, and preferably is, prestressed or under tension in order to bias the parts to the position shown and to keep the cam followers in contact with the peripheral surface of the cam structure.

In accordance with the present invention, standardizing operations may be manually initiated by rotating the lever 30 in a counter-clockwise direction to operate the transfer switch 44 and to bring the disc 39 into driving engagement with the disc 40. This may be accomplished in any desired manner, such as by providing a handle 43a on the crank arm 43. Manual standardizing is sometimes all that is needed in an instrument, and where automatic standardizing is provided, it is additionally desirable to provide for the manual initiation and termination of a standardizing cycle, as for example, when the battery 10 is renewed.

The measuring system of Fig. 1 is to be taken as illustrative of high-speed measuring systems of the type disclosed in detail in Fig. 4 of Williams Patent 2,113,164, where a generator tachometer is utilized to introduce a velocity component of voltage to prevent hunting and to provide suitable damping for operation of the motor 17 without overshoot of the balance point. In Fig. 1 of the present application a damping network 48 serves in conjunction with adjustment of the slidewire 14 to introduce a component proportional to the speed of the adjustment of slidewire 14 (i. e., speed of the motor 17) for proper damping. The present invention, largely directed toward the actuating mechanism may be used in connection with measuring systems of other types including the one described in said Ross et al. Patent 2,113,069. It is also to be understood that the movement of the lever 30 may be utilized to open and close a circuit, in which case the discs 39 and 40 may be considered as representing contacts of a circuit interrupter, and, of course, the actuating mechanism may also serve to move a valve or other controlling member between "on" and "off" or between other predetermined positions.

As applied to the standardizing operation, a study of Figs. 1–3 will reveal that if the disc 39 is moved into engagement with the disc 40 prior to the time that the cam follower 31f has been moved into engagement with the lower level of cam structure 23, the end of lever 30 carrying the disc 39 will have been brought to standstill by disc 40. Accordingly, a further movement of lever 31 necessary to bring the cam follower 31f into engagement with the lower level of cam structure 23 will produce relative rotation of lever 30 with respect to the disc 39, the consequence of which will be relative movement between slidewire contact 12a and the slidewire resistor carried by disc 39, but hidden from view in Fig. 1. Such relative movement is undesirable, and though it could be tolerated in other types of control, a "pip" of slight deviation on the record or chart 22 would result. In order to avoid such relative movement the arrangement of Figs. 4–7 is preferred.

As shown in the diagrammatic view of Fig. 4, the disc 39 which also supports the slidewire is pivotally carried by a pivot pin 50 which is itself carried by a link or lever 51 pivotally supported on the shaft 23s of cam structure 23. A pin 52 carried by the free end of lever 30 extends into an elongated slot 51a formed in an upturned extension of lever 51 and, thus, provides for relative movement between lever 30 and lever 51 without relative movement between contact 12a and the standardizing impedance or resistor carried by the disc 39. By providing the additional link or lever 51, an upturned end 51b thereof may conveniently serve as a handle for manual operation of the disc 39 into engagement with the disc 40 to initiate standardizing. The parts in Fig. 4 have been illustrated with the cam follower 31f released by the cam structure 23, and the disc 39 engaging the disc 40. The cam follower 31f has not yet reached the lower level of the cam structure 23. The cam follower 31f does not move to the lower level of the cam structure 23 but is biased toward that lower level by the spring 34 which at the same time maintains the disc 39 in driving engagement with the disc 40. If the cam follower 31f were to engage the lower level of the cam structure 23, the spring 34 would be rendered ineffective to apply a bias or force to maintain the disc 39 against the disc 40.

It is to be understood that in all modifications of the invention, such as Figs. 1–3 and 8–12, an additional link or lever corresponding in function with the lever 51 of Fig. 7 may be employed to provide the lost motion connection comprising the pin 52 and the slot 51a of Fig. 4. Such an additional lever has not been illustrated in the foregoing modifications in order to simplify the disclosure and because the modifications without such lever may, as illustrated and described herein, be useful in other applications such as the operation of switch contacts.

A preferred commercial form of the invention, following the diagrammatic sketch of Fig. 4, is illustrated in Figs. 5–7 where the actuating mechanism is illustrated as mounted on a frame 54 which may as a unit be secured to the indicating and/or measuring instrument in cooperative relation with the shaft 40a driven by the motor 17 (Fig. 1). The shaft 40a may also include a driving pulley 55 around which there is taken a turn or two of a cord or violin string 56 for actuation of the indicator and/or a marker 19, shown in Fig. 1. In Figs. 5–7 the cam structure is shown in the form of two cams 23a and 23b rotatably mounted on a shaft 57 extending between the U-shaped section of the frame 54. The cams 23a and 23b are driven by gear 24, the gear and cam structure being held in place by collar 24a. The cams 23a and 23b may be adjusted angularly with respect to each other in order to vary the angular spacing between the notches 23c and 23d, Fig. 6, a spacer 58 and locking screws 59 being provided for that purpose. Instead of driving the cams 23a and 23b from the synchronous chart-driving motor 27, in Fig. 6 it will be observed that a small clock motor of the synchronous type has been shown at 60 which, through gearing, rotates the cams at low speed. The separate motor 60 is particularly useful for applications where an indicating instrument only is desired. The modification of Figs. 5 and 6 also includes provision for the support of the lever 51 in concentric relation with the cam shaft 57. Though Fig. 7 is a sectional view on the line 7—7 of Fig. 6, it is to be pointed out that it is not a true sectional view since in Fig. 7 the lever 51 is pivotally supported from the frame 54 by a separate pivot pin 61 located in the vicinity of the cam shaft 57. So long as the pivot pin 61 is near or in the neighborhood of cam shaft 57, the operation will be satisfactory.

It is to be observed the lever 51 has a U-shaped lower end portion, the cross portion of which has extending therefrom a short section 41 which engages a flexible or resilient switch-actuating member bearing against a switch-actuating member 44b. The transfer switch itself is mounted in a housing 44a, the switch actuator 44b being visible in Figs. 5 and 7. The upturned arm of lever 51 serves to support the driven disc 39 and the slidewire 12, a pivot pin 50 with an enlarged shoulder having a small threaded end extending thereinto, as best shown in Fig. 6. The upturned end of lever 51 also supports a block 62 of insulating material which has secured thereto the flexible contacts 12a which engage the slidewire 12. As best shown in Figs. 5 and 7, that part of the lever extending downwardly from the cam shaft 57 (or the shaft 61) has an outturned side portion 51a having an elongated slot 51c which extends in a direction generally parallel to the longitudinal axis of lever 31. A pin 52 secured to the lower end of lever 30, as best shown in Fig. 6, extends into the elongated slot 51c and serves to move the slidewire 12 and the driven disc 39 into and out of driving engagement with the slidewire driving disc 40.

In Fig. 5 the parts are shown after release of the cam follower 31a by the cam 23a. The spring 34 has operated the parts to the position shown and there resulted a fast movement of the slidewire into engagement with the drive disc 40 and a snap action on the transfer switch 44 within housing 44a. This fast action resulted from the step provided in cam 23a, referred to as a step in contrast with a gradual change in slope of the cam. In Fig. 7 the parts have been shown after release of the cam follower 30a by the cam 23b, the spring 34 having acted quickly and efficiently to move the slidewire 12 and the disc 39 out of driving engagement with the drive disc 40 and to return with a snap action the transfer switch 44 to the position of Fig. 1. The handle-extension 51b may, of course, protrude to an accessible portion of the instrument or additional mechanical linkage provided for operating it externally of the instrument housing proper.

As earlier stated, the present invention may be applied either to the system like that of Fig. 1 or to an instrument including a mechanical relay of the type illustrated in said Ross et al. Patent 2,113,069. When one of the modifications of the invention is applied to such a mechanical relay type instrument, it is desirable to initiate a standardizing operation at the time the galvanometer pointer or other deflecting element is clamped in a stationary position. This may be readily accomplished by any suitable synchronizing arrangement as, for example, a conventional ratchet type of drive actuated by the cam shaft of the mechanical relay. For each operation of the mechanical relay the ratchet mechanism would step the cam structure 23 or 23a and 23b a predetermined distance, and hence the initiation of the standardizing operation would occur at the time the galvanometer pointer is in clamped position. The spacing between the steps of cams 23a and 23b would then be adequate for several operations of the mechanical relay, and while the pointer is clamped, the ratchet would release the cam follower 30 to terminate the standardizing operation.

With the foregoing disclosure in mind, further modifications of the invention may be made without departing from the principles thereof. For example, referring to Fig. 8, the cams 23a and 23b may be spaced one from the other, though driven by common drive. A stationary pivot 70 may serve to support a lever 71 having a cam follower 71a engaging a cam 23a with the opposite end thereof attached by pivot pin 72 to a link 73 pivotally connected by a pin 74 to a lower lever 75 having a cam follower 76 engaging the cam 23b. The driven disc 39 is pivotally secured by pin 77 to the lever 74 for movement into and out of driving engagement with the disc 40. Since the lever 75 is a floating lever, it is desirable to provide suitable means for retaining it in a relatively fixed position, such a means being shown as an extension 73a of link 73 which slides between two fixed rollers or pins 78 and 79. In this modification the spring 34 is connected to a stationary support and to an extension of the lever 75 which carries a pin 80. The arrangement is such that upon release of the cam follower 71a by the step or recess of cam 23a, the spring rotates the lever 71 in a clockwise direction to rotate the lever 75 upwardly around the cam follower 76 which forms an axis of rotation therefor. After calibrating or standardizing adjustment of the slidewire carried by the disc 39 the cam 23b releases lever 76 which is thereupon rotated by the spring 34 about the pivot 74 to disengage the driving connection.

In Fig. 9 the cam structure 23 is provided with steps approximately 180 degrees apart, the step 23e being arranged first to release a cam follower 83a of a lever 83 for rotation around a fixed pivot 84 under the influence of the spring 34 which acts through a lever 85 carrying the slidewire driving disc 86 through the medium of a connecting link 87. Link 87 is pivotally connected at 88 to the lever 83 and to the link or lever 85 by the pin 89. As in Fig. 8, an extension 87a is slidably mounted between two pins or rollers to anchor the floating link 85 without interfering with its double movement. After the desired standardizing period the step or recess 23f releases cam follower 85a of lever 85 which is thereupon rotated by a spring 34 in a counter-clockwise direction to disengage the driving connection between the disc 40 and the disc 86.

In the several forms of the invention, energy is gradually accumulated in the spring over a substantially long period of time, and a part of the energy is utilized to initiate standardization, and the remaining part is used to terminate the standardizing operation. The spring, common to both levers and their cam followers, serves to maintain the levers against the cam structure, and both levers cooperate to apply tension to the spring over the long period of time to accumulate the needed energy to initiate and terminate standardizing operation. While the cam followers cooperate individually with the cam structure for the successive release of part of the accumulated energy, they jointly cooperate with the cam structure for the accumulation of the operating energy. The individual and successive operation of the cam followers for successive release of parts of the accumulated energy to produce the movement of the slidewire first into a coupled and then a decoupled driving relation with the balancing motor or driving means is particularly advantageous and makes possible the use of a relatively simple and reliable mechanism for initiating and terminating the standardizing operations.

Figure 10:
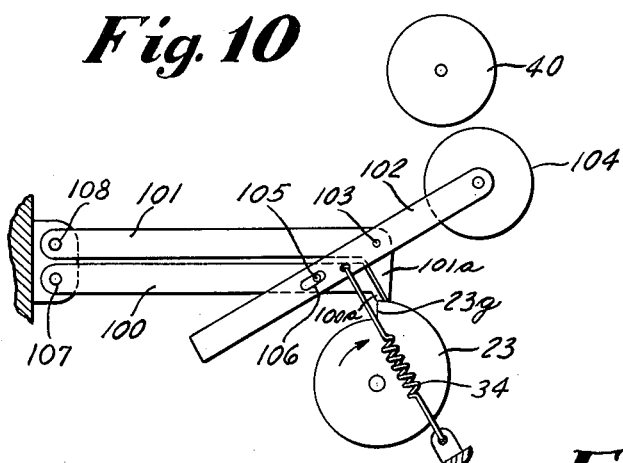
Figure 11:
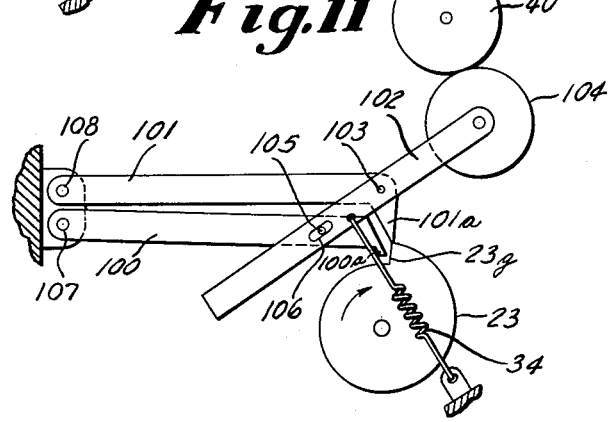
Figure 12:
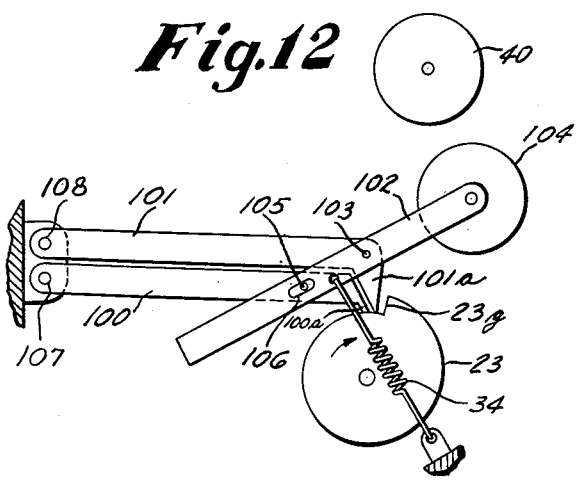

A still further modification of the invention is illustrated in Figs. 10–12 inclusive where the slidewire driving disc 104 is carried by a lever 102 which pivotally interconnects levers 100 and 101 respectively pivotally connected at 107 and 108 to a fixed support which may be a part of the frame. A pivot pin 103 extends from the free end of lever 101 through an intermediate portion of lever 102, while a pivot pin 105 extends from the lever 100 into an elongated slot 106 provided adjacent the end of lever 102 remote from the disc 104. It will be observed that the cam follower 100a at the end of lever 100 when released by the cam structure 23 is, by the spring 34 extending from a stationary support to point on the lever 102 intermediate the slot 106 and the pin 103, biased downwardly toward the lower level of the cam structure. Accordingly, lever 100 is by spring 34 moved down cam step 23g toward the lower level of cam structure 23. The movement of cam follower 100a and of lever 100 toward the lower level of cam 23 produces counter-clockwise rotation of lever 102 and swings the slidewire driving disc 104 into engagement with the driving disc 40, all as shown in Fig. 11. As in the preceding modifications of the invention, the cam follower 100a does not quite reach the lower level of cam structure 23 so that there remains a substantial component of force from spring 34 which maintains the disc 104 in driving engagement with disc 40 until release by the cam follower 101a.

Upon continued rotation of cam structure 23, the cam follower 101a is released, and the spring 34 is then effective to rotate link 101 in a clockwise direction about its stationary pivot 103, thereby rotating link 102 in a clockwise direction about the pivot pin 105. The parts then take the positions illustrated in Fig. 12 to terminate the standardizing operation. The transfer switch may be operated by a switch-actuating member attached to lever 102, and as has been previously explained in connection with other modifications, the end of lever 102 may itself perform the function of a switch-actuating member for such applications where an adjustment of a resistor or impedance device is not required. The slot 106 has been illustrated extending lengthwise of the lever 102 and provides the lost motion connection necessary to the joint downward movement of the levers 109 and 101. Obviously, the pin 105 and cooperating slot 106 may in position be interchanged as between levers 109 and 102.

In the preferred form of the invention a torque of approximately 0.3 ounce-inch at one revolution per minute was required to drive the cams. Since the small synchronous clock motors available on the market at relatively low cost ordinarily produce torque of the order of 5 ounce-inches at one revolution per minute, it will be seen a substantial factor of safety is provided and that such clock motors are readily applicable to the operation of the standardizing mechanism. In contrast with the torque requirements of standardizing apparatus of the type previously utilized, torque requirements which have been as high as 36 ounce-inches, there have resulted savings from the present invention in the size of the motor required to drive the chart. Moreover, the low torque requirements of the present mechanism means exceedingly small wear and long life of the mechanism as a whole. The snap action in both opening and closing the transfer switch is particularly useful in those applications of the invention where a control switch may be carrying a substantial current, and is also useful in the application to standardizing of measuring instruments.

In summary, it will be observed that in Fig. 1 upon release of cam follower 31f, lever 31 releasing the restraint through connection 38 makes the spring 34 effective to rotate lever 30 as a lever of the third class to move member 39 into engagement with member 40. Upon release of cam follower 30f the spring 34 then rotates lever 30 about pivot connection 38 as a lever of the first class to move member 39 away from member 40.

The transformation of the rotation of lever 75 of Fig. 8 from a lever of the second class to one of the first class is accomplished as already described. Upon release of cam follower 71a the spring 34 is then effective to rotate lever 75 about the cam follower 76 as a pivot and as a lever of the second class to move member 39 against member 40. However, upon release of cam follower 76 lever 75 is rotated by spring 34 about pivot 74 and as a lever of the first class to move member 39 away from member 40.

In the modification of Figs. 10–12 the lever 102 is first operated as a lever of the first class and then as a lever of the third class to move the member 104 from a first position to a second position and then from the second position to the first position.

Similarly in the modification of Fig. 9, the lever 85 upon release of the cam follower 83a is rotated by spring 34 about cam follower 85a as a lever of the first class to move member 86 from its illustrated first position to a second position in engagement with member 40. Upon release of cam follower 85a the spring 34 rotates lever 85 as a lever of the second class to move member 86 from its second position to its first and illustrated position away from member 40.

While preferred forms of the invention have been disclosed, it is to be understood that other modifications may be made within the scope of the appended claims.

What is claimed is:

1. An actuating mechanism comprising a cam structure, a first lever having a stationary pivotal support and a first cam follower spaced therefrom, a second lever having a cam follower, structure pivotally interconnecting said first and second levers at points spaced from said cam followers, and biasing means for biasing both of said levers in directions to press their respective cam followers against said cam structure, said cam followers and said cam structure being so constructed and arranged for release first of said first lever and then of said second lever for movement by said biasing means of said second lever first in one direction and then in the other direction.

2. An actuating mechanism comprising cam structure, a first lever having a stationary pivotal support and a first cam follower spaced therefrom, a second lever having a second cam follower, structure pivotally interconnecting said first and second levers at points spaced from said cam followers, and biasing means for biasing both of said levers in directions to press their respective cam followers against said cam structure, said biasing means upon release of said first lever moving said second lever in one direction and upon release of said second lever moving said second lever in the opposite direction.

3. An actuating mechanism comprising a cam structure, a first lever having a stationary pivotal support adjacent one end and a first cam follower adjacent the opposite end, a second lever having a second cam follower adjacent one end and having structure to be controlled connected adjacent the opposite end thereof, structure pivotally interconnecting said first and second levers intermediate the respective ends thereof, and biasing means connected to said second lever between said second cam follower and said pivotally interconnecting structure for biasing both of said cam followers against said cam structure, said biasing means upon release of said first lever rotating said second lever and said structure controlled thereby in one direction and upon release of said second cam follower rotating said second lever and said structure controlled thereby in the opposite direction.

4. An actuating mechanism comprising a cam structure, a first lever having a stationary pivotal support adjacent one end thereof and a first cam follower adjacent the opposite end thereof, a second lever pivotally connected to said first lever intermediate the ends thereof and having at one end portion a cam follower disposed adjacent the cam follower of said first lever, said second lever having the opposite end thereof operatively engaging a device to be controlled by rotation of said second lever, and biasing means connected to said second lever for biasing both of said cam followers against said cam structure and being effective upon release of said first lever for rotating said second lever in one direction and for rotating it in the opposite direction upon release of said second cam follower.

5. The combination set forth in claim 4 in which the structure controlled by rotation of said second lever is pivotally supported from a link rotatable about an axis in the neighborhood of said cam structure, and a lost motion connection between said controlled structure and the end of said second lever remote from said second cam follower.

6. The combination set forth in claim 4 in which the structure controlled by rotation of said second lever is pivotally supported from a link rotatable about the axis of said cam structure, a lost motion connection between said controlled structure and the end of said second lever remote from said second cam follower, and an arm carried by said link engaging said controlled structure and effective only upon relative rotation therebetween for producing a controlling action.

7. An actuating mechanism comprising a first lever having a stationary pivotal support and a cam follower spaced therefrom, cam structure engaged by said cam follower for controlling movement of said first lever, a second lever supported by said first lever and having a cam follower engaging said cam structure for controlling movement thereof, and biasing means connected to said second lever for forcibly maintaining both of said levers against said cam structure for movement of said second lever first in one direction and then in the opposite direction in response to successive movement of said levers under the control of said cam structure.

8. An actuating mechanism comprising a cam structure, a first lever having a stationary pivotal support and a first cam follower spaced therefrom, a second lever having a cam follower, structure pivotally interconnecting said first and second levers at points spaced from said cam followers, and biasing means for biasing both of said levers in directions to press their respective cam followers against said cam structure, said cam followers cooperating individually with said cam structure for successive release of said first and second levers for movement by said biasing means of said second lever first in one direction and then in the other direction.

9. An actuating mechanism comprising cam structure, a first lever having a stationary pivotal support and a first cam follower spaced therefrom, a second lever having a second cam follower, said first and second levers being pivotally interconnected intermediate their ends providing a scissor-like movement therebetween, and biasing means for biasing both of said levers in directions to press their respective cam followers against said cam structure, said biasing means upon release of said first lever moving said second lever in one direction and upon release of said second lever moving said second lever in the opposite direction.

10. An actuating mechanism comprising cam structure, a pair of scissor-like levers pivotally connected intermediate their ends comprising a first and second lever, said first lever having a stationary pivotal support and a first cam follower spaced therefrom, said second lever having a second cam follower, and biasing means for biasing both of said levers in directions to press their respective cam followers against said cam structure, said biasing means upon release of said first lever moving said second lever in one direction and upon release of said second lever moving said second lever in the opposite direction.

11. An actuating mechanism comprising cam structure, a first lever having a stationary pivotal support and a first cam follower spaced therefrom, a second lever having a second cam follower, structure pivotally interconnecting said first and second levers at points spaced from said cam followers, and biasing means for biasing both of said levers in directions to press their respective cam followers against said cam structure and acting in one direction only, said biasing means upon release of said first lever moving said second lever in one direction and upon release of said second lever moving said second lever in the opposite direction.

12. An actuating mechanism comprising rotatable cam structure, a first lever having a stationary pivotal support and a first cam follower spaced therefrom, a second lever having a second cam follower, structure pivotally interconnecting said first and second levers at points spaced from said cam followers, and biasing means for biasing both of said cam followers against said cam structure, said cam followers jointly cooperating with said cam structure slowly to accumulate energy in said biasing means, said cam followers cooperating individually with said cam structure for successive release of said first and second levers, part of the accumulated energy being expended upon release of said first lever for moving said second lever in one direction and the remainder of said accumulated energy being expended upon release of said second lever for moving said second lever in the opposite direction.

13. An actuating mechanism comprising a movable support for a driven member, spring means for moving said support to effect coupling and decoupling engagement between said driven member and a driving member, rotating cam structure, and pivoting means including cam followers jointly cooperating with said cam structure to slowly accumulate energy in said spring means, one of said cam followers cooperating with said cam structure for expenditure of part of the accumulated energy of said spring means in effecting coupling movement of said support and the other of said cam followers cooperating with said cam structure for expenditure of the remainder of the accumulated energy of said spring means in effecting decoupling movement of said support.

14. An actuating mechanism for initiating and terminating a control operation comprising rotatable cam structure, a first lever having a stationary pivotal support and a first cam follower spaced therefrom, a driven member, a link pivoted in the vicinity of said cam structure and supporting at a position in spaced relation therewith said driven member, a second lever having a second cam follower, structure pivotally interconnecting said first and second levers at points spaced from said cam followers, biasing means for biasing both of said cam followers against said cam structure, said cam followers jointly cooperating with said cam structure slowly to accumulate energy in said biasing means, said cam followers cooperating individually with said cam structure for successive release of said first and second levers, part of the accumulated energy being expended upon release of said first lever for moving said second lever in one direction and the remainder of said accumulated energy being expended upon release of said second lever for moving said second lever in the opposite direction, driving means for said driven member, and a lost motion connection between said link and said second lever for movement of said driven member by said second lever into driving engagement with said driving means with the force of said biasing means applied thereto to maintain said driving engagement, operation of said second lever in said opposite direction acting through said lost motion connection to disengage said driving connection.

15. An actuating mechanism for a member movable between a first position and a second position comprising lever structure including at least one lever and two cam followers, rotatable cam structure disposed in cooperative relation with said cam followers, said cam structure having a surface of variable radius for controlling radial movement of said cam followers, means for biasing said cam followers toward said cam structure, an operating connection between said lever and said member, and means including said cam followers and said biasing means for establishing upon release by said cam structure of a first of said cam followers rotation of said lever about a pivotal center as a lever of one class of levers and upon release by said cam structure of a second of said cam followers for establishing rotation of said lever about a different pivotal center as a lever of another class of levers, operation of said lever as of one class moving said member from a first position to a second position and operation of said lever as another class of levers returning said member from said second position to said first position.

16. An actuating mechanism for a member movable between a first position and a second position comprising a linkage including a first lever and a second lever, said levers having a pair of cam followers at corresponding ends thereof, an actuating connection between said member and the end of said second lever remote from its cam follower, cam structure disposed for engagement by said cam followers for controlling movement thereof radially of said cam structure, spring means for biasing said cam followers toward said cam structure, said cam structure having a configuration including a step for release first of one cam follower and then of said second cam follower for movement of said followers in succession radially of said cam structure by energy stored in said spring means, pivotal means including at least two pivotal centers for said linkage, one of which centers is stationary and is disposed at the end of said first lever remote from its cam follower and is disposed with respect to said actuating connection and its said cam follower for actuation by said spring means of said linkage to move said member from said first position to said position, and the other of which pivotal centers is differently disposed with respect to said actuating connection and interconnects said levers intermediate their respective ends and being movable therewith and disposed with respect to the other of said cam followers for actuation of said linkage by said spring means, and said spring means being connected to said second leved intermediate said pivot and the cam follower thereof for actuation by said spring means of said linkage to move said member from said first position to said second position and to move said member from said second position to said first position as said cam followers are respectively released by said cam structure.

17. The combination set forth in claim 16 in which said member is supported on a link pivoted about an axis adjacent the axis of rotation of said cam structure, and a lost-motion connection between said link and the end of said second lever remote from its cam follower, said link having an extension for movement of said member to its said second position without release of said levers by said cam structure.

18. An actuating mechanism for a member movable between a first position and a second position comprising a linkage including a first lever and a second lever respectively having cam followers at corresponding ends thereof, cam structure disposed for engagement by said cam followers for controlling movement thereof radially of said cam structure, spring means for biasing said cam followers toward said cam structure, said cam structure having a configuration including a step for release first of one cam follower and then of said second cam follower for movement of said followers in succession radially of said cam structure by energy stored in said spring means, pivotal means including at least two pivotal centers, one of said centers for said first lever intermediate the ends thereof being stationary and one of which centers is disposed with respect to said actuating connection and one of said cam followers for actuation by said spring means of said linkage to move said member from said first position to said second position, and the other of which pivotal centers is differently disposed with respect to said actuating connection and the other of said cam followers for actuation of said linkage by said spring means to move said member from said second position to said first position, a link pivotally interconnecting the ends of said first lever remote from its cam follower and the end portion of said second lever remote from its cam follower, and guide means restraining said second lever from lateral movement relative to its cam structure, said spring means being connected to the end of said second lever beyond said link for biasing both of said levers toward said cam structure, said first-named member being operatively connected to said second lever between said link and the cam follower thereof.

19. An actuating mechanism for a member movable between a first position and a second position comprising cam structure, a linkage having an actuating connection between it and said member and including a first lever and a second lever disposed on opposite sides of said cam structure and including a pair of cam followers, said cam followers being intermediate the ends of said levers, said cam structure having a configuration including a step for release first of one cam follower and then of said second cam follower for movement of said cam followers in succession radially of said cam structure, pivotal means including at least two pivotal centers for said linkage and including a stationary support for one end of said first lever and a link pivotally interconnecting the opposite ends of said levers, spring means attached to the end of said second lever remote from its pivoted end and acting to press said levers and their cam followers toward said cam structure, one of which pivotal centers is disposed with respect to said actuating connection and one of said cam followers for actuation by said spring means of said linkage to move said member from said first position to said second position, and the other of which pivotal centers is differently disposed with respect to said actuating connection and the other of said cam followers for actuation of said linkage by said spring means to move said member from said second position to said first position and guiding means for preventing lateral movement of said second member relative to said cam structure, said member being operatively connected to said second lever between said cam follower and the pivoted end thereof.

20. An actuating mechanism for a member movable between a first position and a second position comprising a linkage having an actuating connection between it and said member, said linkage comprising a first lever and a second lever having cam followers at corresponding ends thereof, cam structure disposed for engagement by said cam followers for controlling movement thereof radially of said cam structure, spring means for biasing said cam followers toward said cam structure, said cam structure having a configuration including a step for release first of one cam follower and then of said second cam follower for movement of said followers in succession radially of said cam structure by energy stored in said spring means, pivotal means including at least two pivotal centers for said linkage pivotally supporting the respective ends of said levers remote from said cam followers and including a link pivoted at spaced points respectively to said first and second levers, one of said pivotal centers being disposed with respect to said actuating connection and one of said cam followers for actuation by said spring means of said linkage to move said member from said first position to said second position and the other of which pivotal centers is differently disposed with respect to said actuating connection and the other of said cam followers for actuation of said linkage by said spring means to move said member from said second position to said first position, said spring means being attached to said link intermediate its pivotal connections to said levers, one of said last-named pivotal connections including a lost-motion connection, said member being actuated under control of said cam structure by rotation of said link first about one of its pivotal connections and then about the other.

WILLIAM RUSSELL CLARK.

REFERENCES CITED

The following references are of record in the file of this patent:

UNITED STATES PATENTS

| Number | Name | Date |
|---|---|---|
| 288,130 | Skinner | Nov. 6, 1883 |
| 719,390 | Stockall, Jr. | Jan. 27, 1903 |
| 1,931,223 | Harrison | Oct. 17, 1933 |
| 2,368,912 | Barnes | Feb. 6, 1945 |
| 2,404,891 | Schmitt | July 30, 1946 |
| 2,446,153 | Belcher | July 27, 1948 |